United States Patent [19]

Kotuby

[11] 4,056,216
[45] Nov. 1, 1977

[54] LIQUID DISPENSING PUMP AUTOMATICALLY SEALABLE AGAINST LEAKAGE

[75] Inventor: Paul M. Kotuby, Naugatuck, Conn.

[73] Assignee: The Risdon Manufacturing Company, Naugatuck, Conn.

[21] Appl. No.: 676,415

[22] Filed: Apr. 13, 1976

[51] Int. Cl.² .............................................. G01F 11/04
[52] U.S. Cl. ..................................... 222/385; 222/512
[58] Field of Search ............... 222/321, 385, 409, 512; 239/340, 350, 354, 373, 579

[56] References Cited

U.S. PATENT DOCUMENTS

| | | | |
|---|---|---|---|
| 3,250,444 | 5/1966 | Ward | 239/350 X |
| 3,257,961 | 6/1966 | Schlenker | 222/321 X |
| 3,279,151 | 3/1966 | Boris | 239/353 X |
| 3,500,760 | 3/1970 | Schlenker | 222/321 X |
| 3,949,906 | 4/1976 | Peterson et al. | 222/321 X |

*Primary Examiner*—Robert B. Reeves
*Assistant Examiner*—Fred A. Silverberg
*Attorney, Agent, or Firm*—St. Onge, Mayers, Steward & Reens

[57] ABSTRACT

A finger-operable pump, adapted to be mounted on a hand-held container of liquid consumer product to provide an unpressurized dispenser package, includes a housing, that defines a pumping chamber, and a plunger telescopically received in the chamber for conventional pumping movement. A stem formed with the plunger projects outwardly of the housing. The pump further incorporates an improvement in the form of an automatically operable seal arrangement for preventing leakage of liquid which comprises a conical valve seat formed about the mouth of a discharge passage through the plunger and stem and a valve element, having dome-shaped and conical portions, located in the pumping chamber to sealingly engage the valve seat. An actuator button is mounted on the outer end of the plunger stem and is linked, through an elongated connecting rod, to the valve element to move it out of engagement with the valve seat and then to reciprocate the plunger into the pumping chamber away from a home position. A spring automatically closes the valve element and seat when the actuator button is released and then urges the plunger back to its home position. Separate ring and gland seals prevent leakage past the actuator button-plunger stem connection.

10 Claims, 5 Drawing Figures

LIQUID DISPENSING PUMP AUTOMATICALLY SEALABLE AGAINST LEAKAGE

BACKGROUND OF THE INVENTION

1. Field of the Invention

The present invention relates to a finger-operable pump adapted for installation on a non-pressurized, hand-held container of a liquid consumer product to form a liquid dispensing package. More particularly, this invention relates to an assembly incorporated in the liquid dispensing pump for automatically sealing it against leakage.

Liquid dispensing pumps are now commonly used to dispense various liquid products from hand-held, non-pressurized containers. For example, these pumps can be used to dispense liquids such as window and all purpose cleaners, insecticides, germicides, room deodorizers and the like as well as personal products such as hair sprays, deodorants, and colognes. In addition, these pumps serve not only as dispensers but also as closures for containers during shipment, handling, and storage.

2. Description of the Prior Art

Finger-operable liquid dispensing pumps for dispensing liquid consumer products are well known. Typically, these pumps include a housing which defines a pumping chamber. A piston or plunger is mounted for reciprocal pumping movement in the chamber and has a discharge passage therethrough which conducts liquid from the chamber. Conventional check valves control liquid movement during pumping operation by preventing return flow of liquid through the pump. The plunger may also be equipped with an actuator button having a atomizing device to break the liquid dispensed through it into fine particles to form a mist.

Since these dispensing pumps also frequently serve as closures for the containers on which they are installed, both when used and not used, they should provide assured sealing capability to prevent leakage from the container. Particularly, they should prevent leakage during shipping and related handling as well as during consumer use when the package may be inverted or accidentally upset or dropped.

Various pump designs have been proposed which include leakage preventing features. For example, copending U.S. Pat. application Ser. No. 559,894, now U.S. Pat. No. 3,949,906 (Peterson et al.), assigned to the assignee of the present invention, discloses a sealing assembly having two seal members which are shifted between seated and unseated positions by rotation of one of relative to the other. Since one seal member is non-rotatably coupled to the housing and the other to the plunger, relative rotation is effected by rotating the pump plunger relative to the pump housing. A camming action is thus produced which either unseats the seal members or permits them to reengage.

Another seal arrangement, disclosed in U.S. Pat. No. 3,239,151 (Boris), comprises a housing defining a pump chamber in which a plunger having a stem is telescopically received. A tube having a valve member at its lower end is slidably mounted in the plunger stem and is coupled at its upper end to an actuator button. When the button is depressed, the tube is also depressed relative to the plunger to unseat the valve member and provide a discharge passage from pump. A sliding seal is made between the tube and plunger stem or, in another embodiment, between the tube and the pump housing. In different embodiments, the valve element makes either a conical or an annular surface seal with an appropriate valve seat.

Other dispenser pumps similar to that shown in the Boris Patent are disclosed in U.S. Pat. Nos. 3,362,344 (Duda); 3,583,605 (Corsette); 3,627,206 (Boris); 3,640,470 (Susuki et al.); 3,680,790 (Boris); and 3,724,726 (Susuki et al.).

SUMMARY OF THE INVENTION

In the preferred embodiment, to be described below in detail, the liquid dispensing pump of the present invention includes a seal arrangement which automatically opens when the pump is operated in order to discharge liquid, yet which automatically seals after pump operation is completed. The seal arrangement also incorporates other features which prevent liquid leakage from the pump during periods of storage, shipment, as well as during periods of use.

The pump is finger-operable and is adapted to be mounted on a container to dispense the container's liquid contents. It includes a housing, that defines a pumping chamber, and a plunger, that has a stem projecting outwardly of the housing. The plunger defines a discharge passage and is telescopically received in and makes a sliding piston fit with the pumping chamber so that it may be reciprocated away from and back to a home position. A check valve prevents return flow of liquid back through the inlet of the pumping chamber.

The automatically operable seal arrangement which prevents leakage through the pump comprises a conical valve seat formed about the inlet to the plunger discharge passage. A cooperating stopper assembly, positioned in the pumping chamber, includes a valve element that has a dome or ball-shaped portion and a conical portion which respectively make secondary and primary seals with the valve seat. The conical valve element has a pitch angle different from the pitch angle of the conical valve seat. An elongated connecting rod is linked to the valve element, extends freely through the plunger discharge opening, and teminates at an end projecting outwardly from the plunger.

The plunger and seal arrangement are operated by an actuator button which has a first socket for receiving the projecting end of the connecting rod and a second socket, that defines an annular shoulder at the junction with the first, for slidingly receiving the projecting end of the plunger stem in axially reciprocally movable relation. The button is therefore movable toward the housing to a plunger-operating position to disengage the valve element and valve seat through the connecting rod. Further movement of the actuator button toward the housing then moves the plunger away from its home position in pumping action. When the actuator button is released, a spring urges the valve element back into engagement with the seat and then urges the plunger back to its home position.

The seal arrangement further includes a ring seal formed on the shoulder in the actuator button to abut the projecting end of the plunger when the button is moved to the plunger-operating position. Additionally, a gland seal is mounted in the button to slidingly seal between the outer surface of the plunger and the actuator button.

The configuration of the stopper assembly valve member and cooperating valve seat provides a circular ring of contact between them which positively results when the two are engaged. Thus, problems in prior art pumps which ordinarily arise, for example, because of the difficulty in molding smooth seal mating surfaces without mold parting lines, are minimized. The ring and gland seals which seal between the actuator button and the plunger also cooperate to prevent leakage therefrom during either pump use or non-use. These sealing features are achieved in a pump having relatively few parts which are easily manufactured at low cost.

Thus, it is an object of the present invention to provide a liquid dispensing pump which is automatically sealable against leakage during operation as well as during shipment, storage, and handling.

Other objects, aspects, and advantages of the present invention will be pointed out in, or will be understood from, the following detailed description provided below in conjunction with the accompanying drawings.

DETAILED DESCRIPTION OF THE PREFERRED EMBODIMENT

Figure 1:
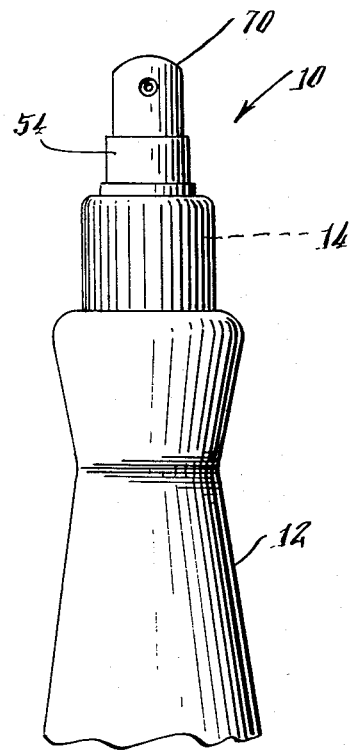
FIG. 1 is a partial side elevational view of the liquid dispensing pump of the present invention installed on a container.

FIG. 1 illustrates the preferred embodiment of the pump of the present invention, generally indicated at 10, installed on a container 12 formed with a threaded neck 14. The pump is received in a mouth 16 defined by the neck 14 to form a closure for the container as well as a means for dispensing liquid which is contained in it.

Figure 2:
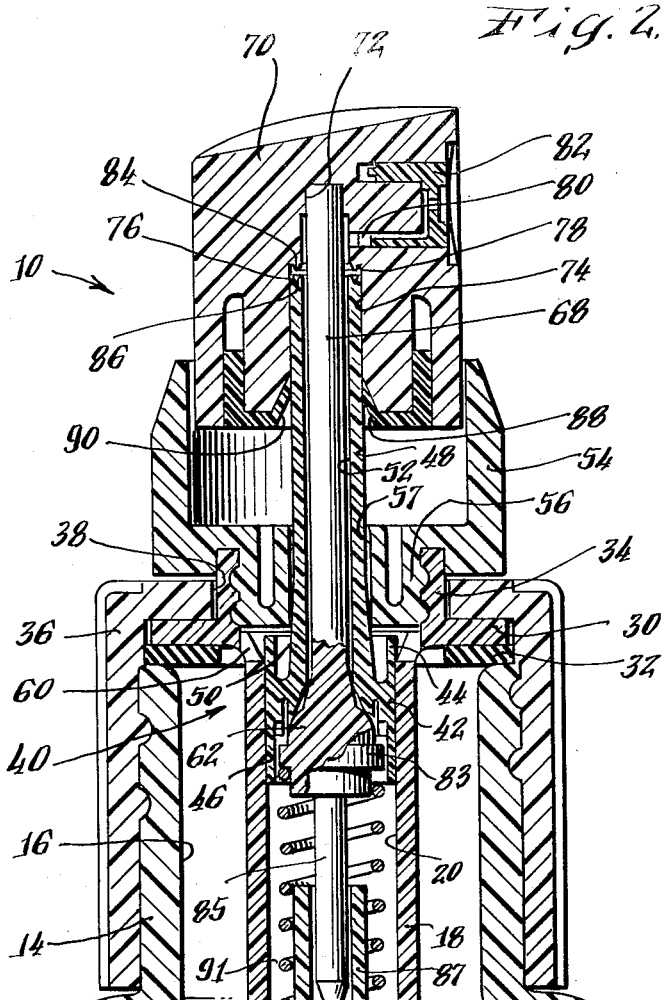
FIG. 2 is an enlarged vertical cross-sectional view of the preferred embodiment of the dispensing pump showing the plunger urged to its home position and the stopper assembly closed.

As shown in detail in FIG. 2, pump 10 includes a cylindrical housing 18, the inner surface of which defines a pumping chamber 20. At its bottom end, housing 18 is formed with a tail piece 22 which defines an inlet passage 24 that communicates with the pumping chamber 20. A dip tube 25 is tightly received in the tail piece and extends downwardly to the bottom of the container to conduct liquid to the chamber.

The inlet 24 is formed with a conical valve seat 26 adapted to be engaged by a conventional ball check valve 28 to prevent return flow of liquid from chamber 20.

At its upper end, pump housing 18 is formed with a radially outwardly directed flange 30 that may rest on a rubber gasket 32 that in turn engages the top of container mouth 16. Extending axially upwardly from the flange 30 is an annular collar 34 which engages a retainer member in a manner to be described below in detail.

A threaded overcap 36 having a central opening 38 which receives the annular collar 34, is internally threaded to match the threaded neck 14 and thus holds the pump on the container. Accordingly, the gasket 32 is tightly clamped between the flange 30 and the top of the container mouth to form a tight seal. The container and overcap may, of course, be configured in any other suitable manner to attach the two together.

The pump of the present invention also includes a plunger assembly, generally indicated at 40, which comprises a piston 42 having upwardly and downwardly directed annular skirts 44 and 46 respectively. These skirts make a sliding piston fit with the inner wall of the housing 18 in the pumping chamber 20 for conventional pumping movement. The plunger assembly also includes an upwardly projecting hollow stem 48 that has an upwardly, inwardly tapered outer surface 50 which acts as a vent valve in a manner to be described below in greater detail. The stem 48 further defines a fluid discharge passage 52 which runs axially through it, and communicates through the bottom of piston 42 with the pumping chamber 20.

The plunger is held in the housing for reciprocal pumping movement by a retainer 54 having an axially depending cylindrical boss 56 which is received in and encloses the open upper end of the housing 18. The outer surface of the boss and the inner surface of the housing collar 34 are shaped to form an interlocking snap fit to secure the retainer in the housing and thus prevent the plunger assembly from being disengaged therefrom.

The retainer is formed with a central aperture 57 through which the plunger stem 48 projects for free reciprocal movement. As can be seen in FIG. 2, the tapered outer surface forms a tight seal at the bottom of the retainer aperture when the plunger is reciprocated to its uppermost or "home" position. However, when the plunger assembly is reciprocated away from this home position, the smaller diameter upper portion of the stem forms a gap and thus an air passage between it and the aperture. The housing is formed with several vent conduits 60, which in cooperation with the gap provides a vent passage from atmosphere to the interior of the container during pump operation.

Figure 3:
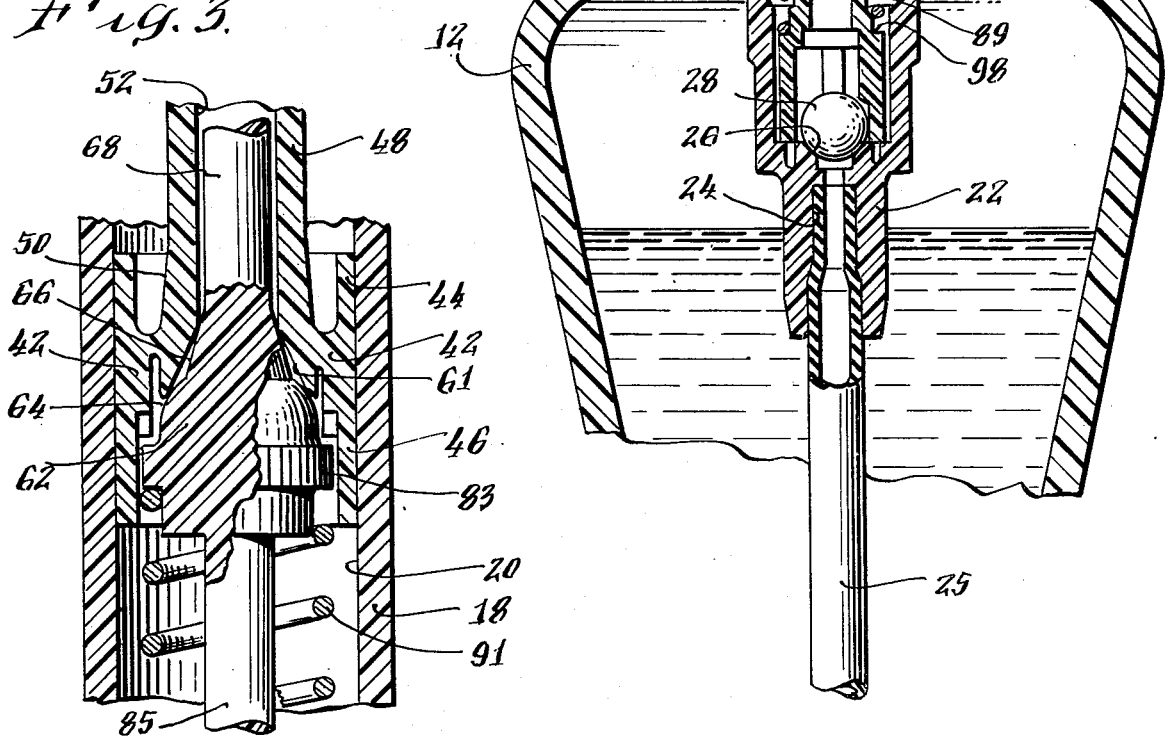
FIG. 3 is a vertical cross-sectional view, enlarged further, illustrating the conical valve seat engaged by the conical valve member of the stopper assembly.

The basic pump described in detail above, incorporates a seal assembly of the invention which automatically closes when the pump is not in use, yet which automatically opens when the pump is operated to dispense liquid. This seal arrangement comprises a conical valve seat 61, shown in detail in FIG. 3, formed about the inlet end of discharge passage 52 on the bottom face of piston 42. A stopper assembly which cooperates with this valve seat is mounted in the pumping chamber and comprises a central valve element 62 having a first dome-shaped portion 64 and a second conical portion 66 extending upwardly from the dome-shaped portion. The conical valve element portion has a different pitch angle than does the conical valve seat as can be seen in FIG. 3. Accordingly, their contact when engaged is a circular line. Simultaneously, the domed portion makes a similar circular line contact with the valve seat at a lower point. The interengagement of the conical valve member portion and conical seat forms the primary seal at the inlet to the discharge passage while the valve seat-domed portion engagement forms a secondary seal. Though it is preferred to incorporate both seals in the sealing arrangement, either the dome-shaped or the conical valve element portion would be used independently of the other if desired.

The stopper member is also formed with an enlarged diameter disc 83 at the base of the dome-shaped portion of valve element 62, and a cylindrical guide stem 85 depends from the disc. A stopper base 87 having a socket 89 is fixed at the bottom of pumping chamber 20 with housing 18. The stem 85 is received in the socket 89 for free rotational and telescoping axial movement to further guide the valve element into firm sealing engagement with the valve seat.

A coil spring 91 is compressed between the bottom of disc 83 and an annular shoulder 98 formed on the exterior of the base 87 to urge the stopper member upwardly.

The valve member is operated to disengage from the valve seat by an elongated connecting rod 68 which cooperates with an actuator button 70. The connecting rod 68 is formed with valve member 62 and projects loosely through the discharge passage 52 to extend above the upper end of the stem. The rod and discharge passage are dimensioned to permit free fluid passage therebetween.

The actuator botton is formed with a first cylindrical socket 72 which receives the projecting end of the elongated connecting rod 68. Accordingly, when the button is reciprocated up and down so too is the elongated rod. A second socket 74 is also formed so the actuator button and is coaxial with and has a larger diameter than the first socket. A shoulder 78 is formed at the junction of the respective sockets.

Figure 4:
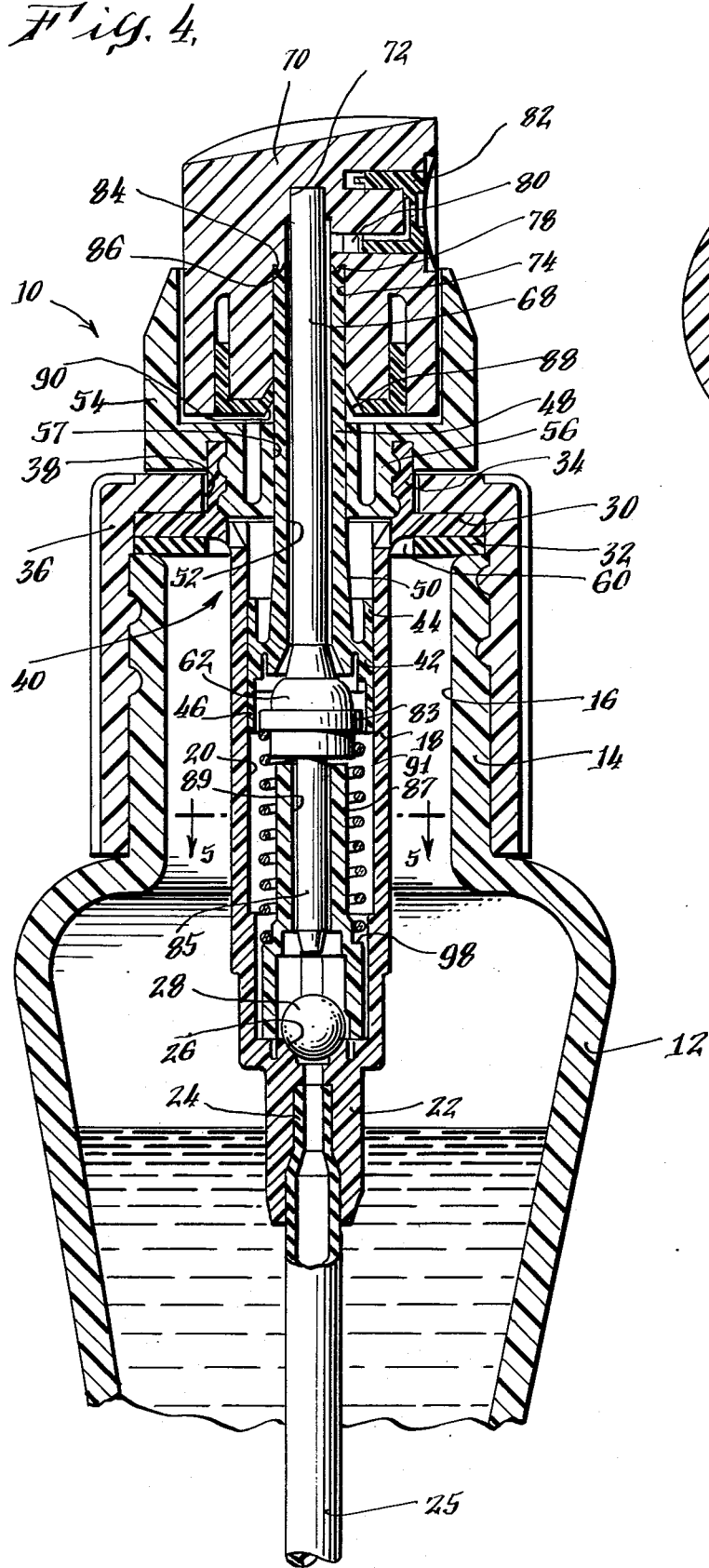
FIG. 4 is a vertical cross-sectional view similar to FIG. 2, showing the actuator moved to its plunger-operating position, the valve member disengaged from the valve seat, and the plunger being depressed in pumping movement.
Figure 5:
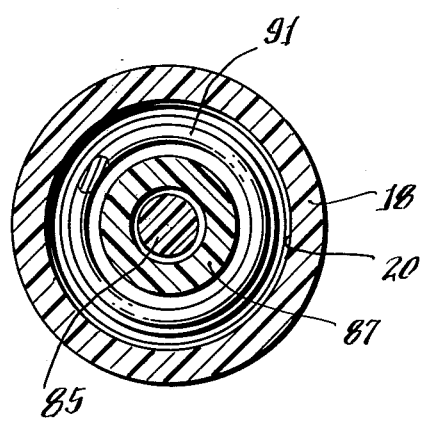
FIG. 5 is a horizontal cross-sectional view taken through plane 5—5 looking downwardly.

The second socket 74 receives the projecting end of the plunger stem 48 in relatively reciprocally movable relation with a sliding fit. Accordingly, when the actuator button is depressed to a plunger-operating position relative to the plunger stem, the base of the second socket or shoulder 78 abuts the upper end 76 of the plunger stem. Further, such movement causes the connecting rod 68 to move the valve element 62 out of sealing engagement with the valve seat 61. Therefore, the valve element-valve seat engagement is automatically broken when the actuator button is depressed. Further depression of the actuator button drives the plunger downwardly in pumping action in the pumping chamber to force liquid around the connecting rod out of the discharge passage into the actuator button (FIG. 4). As shown in detail in FIGS. 2 and 4, the actuator button has an internal discharge passage 80 which communicates with an atomizing nozzle 82 to provide an outlet orifice from which the liquid is ejected.

When the actuator button 70 is released, spring 91 urges the stopper member upwardly to sealingly engage the valve element and valve seat. Thereafter, the entire plunger assembly is urged back to its home position to draw liquid into the pump chamber with pumping movement.

The seal arrangement of the present invention also includes features for sealing the actuator button, which is reciprocally movable as described above, on the plunger stem and for insuring that the frictional forces are such that the valve element and seat disengage before plunger movement is effected. Specifically, the shoulder 78 formed internally of actuator button 70 is provided with a ring seal 84 having a generally V-shaped cross-section. A ring seal accepting recess or seat 86 is formed in the upper end 76 of the plunger stem 48. Thus, as shown in FIG. 4, when the actuator button is moved to the plunger-operating position, the ring seal and recess interengage to prevent liquid flow from passing therebetween to thus insure that all liquid is properly ejected through the atomizing nozzle 82. Of course, other seal configurations may be used in place of V-shaped ring seal 84 and recess 86.

In addition, the actuator button is provided with a resilient gland seal 88 having an upwardly, inwardly directed conical portion 90 which slides against the outer surface 50 of the plunger stem 48. This gland seal prevents leakage of liquid which might pass over the top of the plunger stem and between the second socket 74 and the stem 48 during periods when the pump is not used.

The influence of frictional forces between the ring seal and recess on the sliding connection between the button and plunger stem is negligible. Moreover, the gland seal facilitates easy sliding movement between the button and the plunger stem while serving as an effective seal. Therefore, the balance of frictional forces between the button and stem and between the plunger piston and pump housing is such that the valve element and seat disengage prior to movement of the plunger when the button is depressed. Similarly, the valve element and seat reengage prior to movement of the plunger when the button is released after depression.

Although a specific embodiment of the present invention has been described above in detail, it is to be understood that this is for purposes of illustration. Modifications may be made to the described structure by those skilled in the art in order to adapt this automatically sealing pump to particular applications.

What is claimed is:

1. In a finger-operable pump, adapted to be mounted on a container to dispense the contents thereof, including a housing defining a pumping chamber; a plunger having a stem projecting outwardly at one end of the housing and defining a discharge passage therethrough, the plunger being telescopically received in the pumping chamber for reciprocal movement away from and back to a home position and making a sliding piston fit with the housing; and check valve means for preventing return flow of liquid through the pumping chamber; an automatically operable seal arrangement for preventing leakage through the pump, said seal arrangement comprising:

A. a valve seat formed about the plunger discharge passage,

B. stopper means positioned for cooperative sealing engagement with said valve seat, C. an actuator button formed with a socket, having a base, that receives the projecting end of the plunger stem in axially reciprocally movable relation, said actuator button being movable toward and away from a plunger-operation position with said socket base at least partially abutting the projecting end of the plunger stem to then move the plunger away from its home position, D. link means disposed in the discharge passage, interconnecting said actuator button and stopper means, to disengage said stopper means when said actuator button is in the plunger-operating position, E. seal means for sealing the projecting end of the plunger stem and said base when said actuator button is in the plunger-operating position, said seal means comprising 1. a ring shaped protuberance formed on one of the projecting ends of the plunger stem and said base; and 2. a ring shaped depression, formed on the other of the projecting ends of the plunger stem and said base interfittable with said protuberance, and F. means for urging said stopper means into sealing engagement with said valve seat and said actuator button away from the plunger-operating position and, then, for urging the plunger toward its home position.

2. The automatically operable seal arrangement for preventing leakage through a finger-operable pump as claimed in claim 1 wherein said ring shaped protuberance and ring shaped depression have a triangular cross-sectional shape.

3. The automatically operable seal arrangement for preventing leakage through a finger-operable pump as claimed in claim 1 further comprising:
 gland seal means for slidably sealing between the outer surface of the plunger stem and the actuator button.

4. The automatically operable seal arrangement for preventing leakage through a finger-operable pump as claimed in claim 1 wherein said valve seat is conical.

5. The automatically operable seal arrangement for preventing leakage through a finger-operable pump as claimed in claim 4 wherein said stopper means comprises:
 a conical valve element having a pitch angle different from the pitch angle of said conical valve seat.

6. The automatically operable seal arrangement for preventing leakage through a finger-operable pump as claimed in Claim 4 wherein said stopper means comprises:
 1. a dome-shaped section formed to seat against a first portion of said conical valve seat, and
 2. a conical section formed as an extension of said dome-shaped portion to seat against a second portion of said conical valve seat.

7. The automatically operable seal arrangement for preventing leakage through a finger-operable pump as claimed in claim 1 wherein said link means comprises:
 an elongated rod having cross-sectional area sufficiently small to permit free flow of liquid thereby through the discharge passage.

8. The automatically operable seal arrangement for preventing leakage through a finger-operable pump as claimed in claim 1 further comprising:
 means for guiding said stopper means into sealing engagement with said valve seat.

9. The automatically operable seal arrangement for preventing leakage through a finger-operable pump as claimed in claim 8 wherein said guide means comprises:
 1. an elongated guide stem associated with one of said stopper means and the housing, and
 2. a tubular base member, associated with the other of said stopper means and the housing, defining a channel which freely, telescopically receives said guide stem for axial reciprocal movement in the pumping chamber.

10. In a finger-operable pump adapted to be mounted on a container to dispense the contents thereof, including a housing defining a pumping chamber; a plunger having a stem projecting outwardly at one end of the housing and defining a discharge passage therethrough, the plunger being telescopically received in the pumping chamber for reciprocal movement away from and back to a home position and making a sliding piston fit with the housing; and check valve means for preventing return flow of liquid through the pumping chamber; an automatically operable seal arrangement for preventing leakage through the pump, said seal arrangement comprising:
 A. a conical valve seat formed about the inlet to the plunger discharge passage,
 B. a stopper assembly including
  1. a conical valve element having a pitch angle different from the pitch angle of said conical valve seat, positioned in the pumping chamber for cooperative sealing engagement with said valve seat, and
  2. an elongated connecting rod linked to said valve element, extending freely through the plunger discharge opening, and terminating at an end projecting outwardly of the plunger stem,
 C. an actuator button having
  1. first socket means for receiving the projecting end of said rod,
  2. second socket means, coaxial with and defining an annular shoulder at the junction with said first socket means, for receiving the projecting end of the plunger stem in axially reciprocally movable relation, said actuator button being movable to a plunger-operating position with said shoulder abutting the projecting end of the plunger stem to disengage said valve element and seat through said rod and then to move the plunger away from the home position, and
  3. a discharge orifice communicating with the plunger discharge passage,
 D. ring seal means associated with one of the shoulder and projecting end of the plunger stem to seal between the two when said actuator button is in the plunger-operating position,
 E. gland seal means for slidingly sealing between the outer surface of the plunger stem and the actuator button, and
 F. means for urging said valve element into sealing engagement with said valve seat and said actuator button away from the plunger-operating position and, then, for urging the plunger toward its home position.

* * * * *